United States Patent
Wang et al.

(10) Patent No.: US 11,604,376 B2
(45) Date of Patent: Mar. 14, 2023

(54) DISPLAY APPARATUS AND MANUFACTURING METHOD OF ARRAY SUBSTRATE COMPRISED THEREIN

(71) Applicants: Hefei BOE Optoelectronics Technology Co., Ltd., Anhui (CN); BOE Technology Group Co., Ltd., Beijing (CN)

(72) Inventors: Yan Wang, Beijing (CN); Jie Yang, Beijing (CN); Feng Qu, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/412,086

(22) Filed: Aug. 25, 2021

(65) Prior Publication Data
US 2022/0082882 A1 Mar. 17, 2022

(30) Foreign Application Priority Data
Sep. 11, 2020 (CN) .......................... 202010951337.6

(51) Int. Cl.
*G02F 1/1333* (2006.01)
*G02F 1/1335* (2006.01)
(Continued)

(52) U.S. Cl.
CPC .... *G02F 1/133314* (2021.01); *G02F 1/13452* (2013.01); *G02F 1/133502* (2013.01);
(Continued)

(58) Field of Classification Search
CPC .............. G02F 2001/133314; G02F 1/133308; G02F 2001/133317; G02F 1/133608;
(Continued)

(56) References Cited

U.S. PATENT DOCUMENTS

| | | | | |
|---|---|---|---|---|
| 6,521,539 | B1 * | 2/2003 | Zhou | H01L 21/31116 257/E21.252 |
| 2009/0135330 | A1 * | 5/2009 | Kawase | G02F 1/133603 362/97.2 |
| 2015/0015826 | A1 * | 1/2015 | Mizusaki | C09K 19/56 445/24 |
| 2016/0133198 | A1 * | 5/2016 | Jeong | G09G 3/36 345/212 |
| 2016/0246404 | A1 * | 8/2016 | Zhang | G06F 3/041 |

(Continued)

FOREIGN PATENT DOCUMENTS

| | | | | |
|---|---|---|---|---|
| CN | 106526943 A | * | 3/2017 | ....... G02F 1/133308 |
| CN | 106526943 A | | 3/2017 | |

(Continued)

OTHER PUBLICATIONS

Wang et al., English translation of CN-106526943-A (Year: 2017).*
CN202010951337.6 first office action.

*Primary Examiner* — Jonathan Y Jung
(74) *Attorney, Agent, or Firm* — IPro, PLLC (57) ABSTRACT

The present disclosure discloses a display apparatus and a manufacturing method of an array substrate comprised therein. The display apparatus includes: a backlight module, a display module located on a light-emitting side of the backlight module, and a shell accommodating the backlight module and the display module. The display module includes: an array substrate and a color film substrate which are opposite to each other, and a first polarizer located on one side, facing away from the color film substrate, of the array substrate. The shell includes: a back part arranged on one side, facing away from the color film substrate, of the backlight module; and a plurality of side parts which are in touch with the back part and perpendicular to the back part.

10 Claims, 4 Drawing Sheets

(51) Int. Cl.
*G02F 1/1345* (2006.01)
*G02F 1/1362* (2006.01)
*G02F 1/13357* (2006.01)

(52) U.S. Cl.
CPC .......... *G02F 1/133514* (2013.01); *G02F 1/133528* (2013.01); *G02F 1/136209* (2013.01); *G02F 1/1336* (2013.01); *G02F 1/133331* (2021.01)

(58) Field of Classification Search
CPC ............. G02F 1/1336; G02F 1/133514; G02F 1/133528; G02F 1/133331; G02F 1/133502; G06F 1/1637; H04M 1/0266; H05K 5/0017
See application file for complete search history.

(56) References Cited

U.S. PATENT DOCUMENTS

| | | | | |
|---|---|---|---|---|
| 2017/0060188 A1* | 3/2017 | Han | ............ | G06F 1/1652 |
| 2019/0129257 A1* | 5/2019 | Wang | ............ | G02F 1/134309 |
| 2020/0312251 A1* | 10/2020 | Kim | ............ | G09G 3/3291 |
| 2020/0381565 A1* | 12/2020 | Yamazaki | ......... | H01L 29/66969 |
| 2021/0034182 A1* | 2/2021 | Zheng | ............ | G02F 1/13338 |

FOREIGN PATENT DOCUMENTS

| | | |
|---|---|---|
| CN | 206331209 U | 7/2017 |
| CN | 110112140 A | 8/2019 |
| CN | 110471208 A | 11/2019 |
| JP | 2009069720 A | 4/2009 |
| JP | 2020056943 A | 4/2020 |

* cited by examiner

Fig. 1

--Prior Art--

Fig. 2

--Prior Art--

DISPLAY APPARATUS AND MANUFACTURING METHOD OF ARRAY SUBSTRATE COMPRISED THEREIN

The present application claims the priority from Chinese Patent Application No. 202010951337.6, filed with the Chinese Patent Office on Sep. 11, 2020, and entitled "DISPLAY APPARATUS AND MANUFACTURING METHOD OF ARRAY SUBSTRATE COMPRISED THEREIN", which is hereby incorporated by reference in its entirety.

FIELD

The present disclosure relates to the technical field of display, in particular to a display apparatus and a manufacturing method of an array substrate comprised therein.

BACKGROUND

Figure 1:
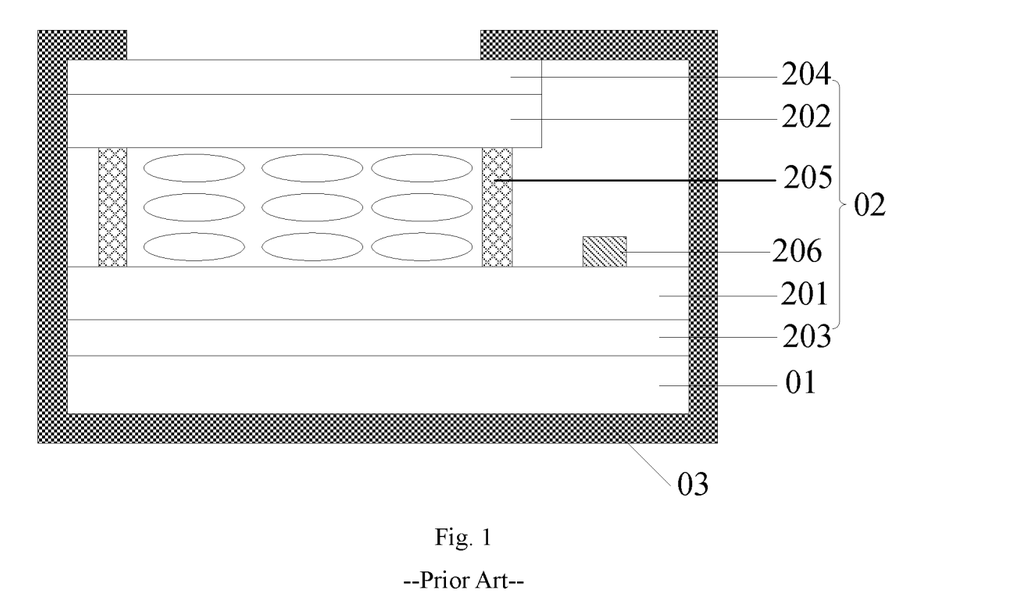
FIG. 1 is a schematic diagram of a sectional structure of a display apparatus in the prior art.

A liquid crystal display apparatus of a conventional notebook computer, as shown in FIG. 1, is mainly composed of a backlight module 01, a display module 02, and a shell 03 of an entire apparatus. The display module 02 includes an array substrate 201, a color film substrate 202, a first polarizer 203 attached to the array substrate 201, a second polarizer 204 attached to the color filter substrate 202, and a sealant 205 for bonding the array substrate 201 and the color film substrate 202. Because a driver integrated circuit (IC) 206 needs to be bound to the array substrate 201, the array substrate 201 exceeds the color film substrate 202. The shell 03 of the entire apparatus fixes the backlight module 01 and the display module 02 through an edge frame. Due to requirements of an assembly process, it is required that the shell 03 and the display module 02 overlap to a certain extent, so a surrounding frame is relatively large, and a periphery has a certain segment gap.

Figure 2:
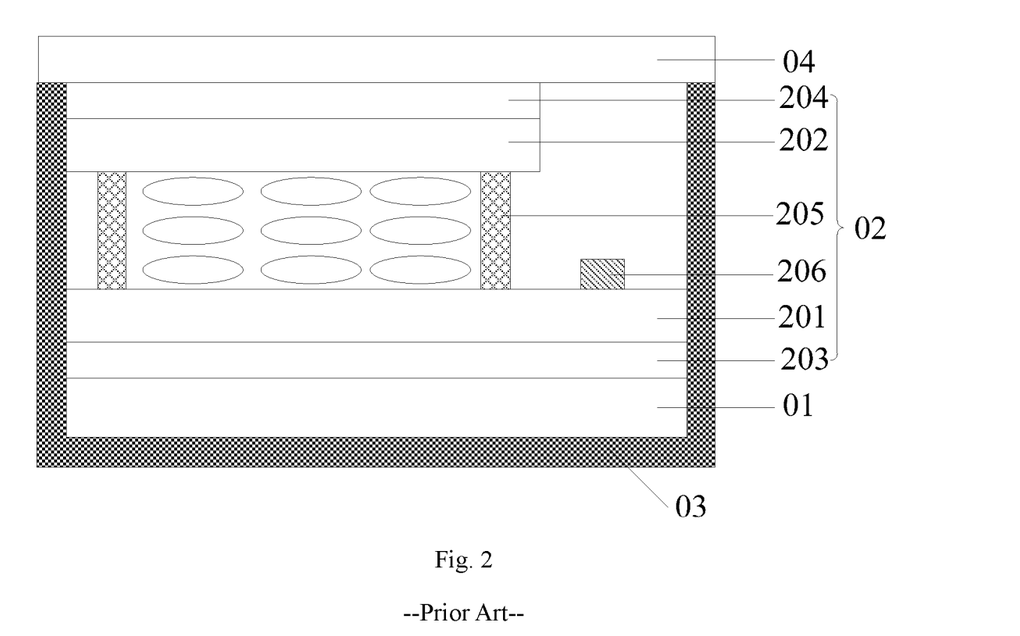
FIG. 2 is a schematic diagram of another sectional structure of a display apparatus in the prior art.

With the trend of notebook computer touch control, the above-mentioned segment gap will cause interference of a finger and the frame during the touch, which greatly affects customer experience. In order to solve the above problem, a structure shown in FIG. 2 is achieved. On the basis of an original liquid crystal display apparatus, a protective cover plate 04 is added. The protective cover plate 04 and the display module 02 are fixed by bonding, a size of the protective cover plate 04 exceeds a size of the display module 02, and an excess part and the shell 03 of the entire apparatus is glued and fixed. Compared with the structure shown in FIG. 1, this structure eliminates a design of an overlapping part of the shell 03 and the display module 02, so that an entire surface of the liquid crystal display apparatus is completely flat, and an appearance is more beautiful. The important thing is that when touch operation is performed, an edge part will not cause interference, which is more conducive to touch operation. At the same time, the frame of the entire liquid crystal display apparatus is reduced to a certain extent due to the cancellation of the overlapping part of the shell 03 and the display module 02.

SUMMARY

An embodiment of the present disclosure provides a display apparatus, including: a backlight module, a display module located on a light-emitting side of the backlight module, and a shell accommodating the backlight module and the display module; where the display module includes: an array substrate and a color film substrate which are opposite to each other, and a first polarizer located on one side, facing away from the color film substrate, of the array substrate, where the color film substrate is located between the array substrate and the backlight module, an orthographic projection of the first polarizer on the array substrate completely coincides with the array substrate, and the first polarizer is multiplexed as a protective cover plate; and the shell includes: a back part arranged on one side, facing away from the color film substrate, of the backlight module; and a plurality of side parts which are in touch with the back part and perpendicular to the back part; where all the side parts are in contact with a side face of the array substrate and a side face of the first polarizer; and one side, facing away from the back part, of the plurality of side parts is flush with one side, facing away from the array substrate, of the first polarizer.

In an embodiment, in the display apparatus provided by the embodiment of the present disclosure, the array substrate includes: a base substrate, an antireflection layer located on the base substrate, and a metal layer located on one side, facing away from the base substrate, of the antireflection layer; where an orthographic projection of the antireflection layer on the base substrate completely coincides with an orthographic projection of the metal layer on the base substrate.

In an embodiment, in the display apparatus provided by the embodiment of the present disclosure, the metal layer is a gate metal layer and/or a source and drain metal layer.

In an embodiment, in the display apparatus provided by the embodiment of the present disclosure, the display module further includes: a light shielding layer located between the first polarizer and the array substrate, where the light shielding layer is located in a frame region of the display module, and the frame region surrounds a display region of the display module.

In an embodiment, in the display apparatus provided by the embodiment of the present disclosure, the array substrate includes a first part and a second part; an orthographic projection of the first part on the back part completely coincides with an orthographic projection of the color film substrate on the back part; an orthographic projection of the second part on the back part does not overlap with the orthographic projection of the color film substrate and is located within the frame region of the display module; and an orthographic projection of the backlight module on the back part completely coincides with an orthographic projection of the array substrate on the back part; where the second part, the backlight module, the color film substrate and the side parts constitute an accommodating space; and the display apparatus further includes: a flexible circuit board located on one side, facing the color film substrate, of the second part; a driving circuit board electrically connected with the flexible circuit board; and a hollow rotating shaft hinged with one side part; where the driving circuit board is bent and arranged in the accommodating space; or, one end, facing away from the flexible circuit board, of the driving circuit board passes through the hinged side part to be fixed in the hollow rotating shaft.

In an embodiment, in the display apparatus provided by the embodiment of the present disclosure, the display apparatus further includes a second polarizer located between the color film substrate and the backlight module, where an orthographic projection of the second polarizer on the color film substrate completely coincides with the color film substrate, and a light transmitting axis of the second polarizer and a light transmitting axis of the first polarizer are perpendicular to each other.

In an embodiment, in the display apparatus provided by the embodiment of the present disclosure, the display module further includes: a liquid crystal layer located between the array substrate and the color film substrate.

Correspondingly, an embodiment of the present disclosure further provides a manufacturing method of the array substrate comprised in the above-mentioned display apparatus, including:

providing a base substrate; and manufacturing an antireflection layer and a metal layer on the base substrate, where an orthographic projection of the antireflection layer on the base substrate completely coincides with an orthographic projection of the metal layer on the base substrate.

In an embodiment, in the manufacturing method provided by the embodiment of the present disclosure, the manufacturing the antireflection layer and the metal layer on the base substrate includes:

forming an antireflection film and a metal film on the base substrate in sequence; and forming the antireflection layer and the metal layer provided with consistent patterns by performing a single masking process on the metal film and the antireflection film.

In an embodiment, in the manufacturing method provided by the embodiment of the present disclosure, the manufacturing the antireflection layer and the metal layer on the base substrate includes:

forming an antireflection film on the base substrate, and forming the antireflection layer provided with a pattern consistent with that of a subsequent gate metal layer and a source and drain metal layer by performing a single masking process on the antireflection film; and forming the gate metal layer and the source and drain metal layer respectively by performing the masking process twice on the antireflection layer in sequence.

DETAILED DESCRIPTION OF THE EMBODIMENTS

In order to make objectives, technical solutions, and advantages of embodiments of the present disclosure clearer, the technical solutions of the embodiments of the present disclosure will be described clearly and completely in conjunction with the accompanying drawings of the embodiments of the present disclosure. It should be noted that the size and shape of each figure in the drawings do not reflect the true ratio, but are only to illustrate the content of the present disclosure. Same or similar reference numerals indicate the same or similar components or components with the same or similar functions. Apparently, the described embodiments are a part of the embodiments of the present disclosure, rather than all of the embodiments. Based on the described embodiments of the present disclosure, all other embodiments obtained by those of skill in the art without creative work shall fall within the protection scope of the present disclosure.

Unless otherwise defined, the technical terms or scientific terms used herein shall have the common meanings understood by those of ordinary skill in the art to which the present disclosure belongs. "First", "second" and similar words used in the specification and claims of the present disclosure do not denote any order, quantity or importance, but are only used to distinguish different components. "Include" or "comprise" and other similar words mean that component or item appearing before the word covers components or items listed after the word and their equivalents, but does not exclude other components or items. "Inner", "outer", "upper", "lower", etc. are only used to indicate a relative position relationship. When an absolute position of a described object changes, the relative position relationship may also change accordingly.

The problem of the display apparatus shown in FIG. 1 and FIG. 2 is that the cost of the protective cover plate 04 is relatively high, which leads to an increase in the cost of the entire liquid crystal display apparatus. Secondly, the protective cover plate 04 leads to an increase in a thickness of the entire liquid crystal display apparatus. Furthermore, a bonding process of the protective cover plate 04 to an entire manufacturing process, also reduces an overall process yield.

Figure 3:
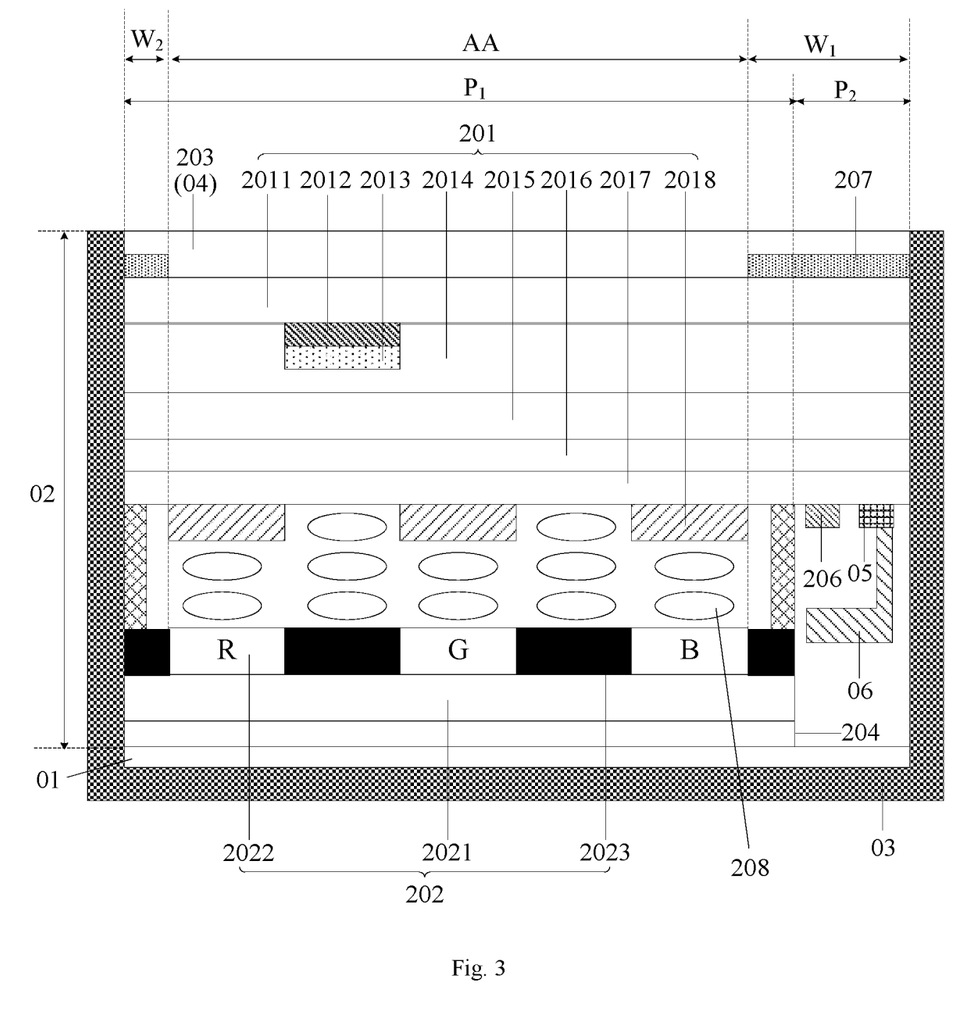
FIG. 3 is a schematic diagram of a sectional structure of a display apparatus provided by an embodiment of the present disclosure.

An embodiment of the present disclosure provides a display apparatus, such as a notebook computer. As shown in FIG. 3, the display apparatus includes: a backlight module 01, a display module 02 located on a light-emitting side of the backlight module 01, and a shell 03 accommodating the backlight module 01 and the display module 02;

where the display module 02 includes: an array substrate 201 and a color film substrate 202 which are opposite to each other; and a first polarizer 203 located on one side, facing away from the color film substrate 202, of the array substrate 201; where the color film substrate 202 is located between the array substrate 201 and the backlight module 01, an orthographic projection of the first polarizer 203 on the array substrate 201 completely coincides with the array substrate 201, and the first polarizer 203 is multiplexed as a protective cover plate 04;

where the shell 03 includes: a back part (shell A) located on one side, facing away from the color film substrate 202, of the backlight module 01; and a plurality of side parts which are in touch with the back part and perpendicular to the back part; where all the side parts are in contact with a side face of the array substrate 201 and a side face of the first polarizer 203; and one side, facing away from the back part, of the plurality of side parts is flush with one side, facing away from the array substrate 201, of the first polarizer 203.

In the display apparatus provided by the embodiment of the present disclosure, the array substrate 201 is inverted to be at the top, and the first polarizer 203 on the array substrate 201 is multiplexed as the protective cover plate 04, which avoids an arrangement of a separate protective cover plate 04, so as to save a bonding process of the protective cover plate 04, thereby realizing lightness and thinness of the display apparatus, simplifying a manufacturing process and improving a product yield.

In general, as shown in FIG. 3, the display apparatus provided by the embodiment of the present disclosure may further include a second polarizer 204 located between the color film substrate 202 and the backlight module 01; where an orthographic projection of the second polarizer 204 on the color film substrate 202 completely coincides with the color film substrate 202; and a light transmitting axis of the second polarizer 204 and a light transmitting axis of the first polarizer 203 are perpendicular to each other.

Optionally, in the display apparatus provided by the embodiment of the present disclosure, the first polarizer 203 is multiplexed as the protective cover plate 04, so that a high-hardness polarizer that is about 0.1 mm larger than a common polarizer (for example the second polarizer 204) in thickness may be selected. Exemplarily, a hardness value of the first polarizer 203 may be larger than or equal to 6H, so that the first polarizer 203 has better scratch resistance. In addition, because a thickness of a protective cover plate 04 in the prior art is generally 0.5 mm or 0.7 mm, and a thickness of an optical adhesive layer bonding the protective cover plate 04 to the display module 02 is about 0.2 mm, when the first polarizer 203 in the present disclosure is multiplexed as the protective cover plate 04, an overall thickness of the display apparatus is reduced by about 0.6 mm to 0.8 mm.

Optionally, in the display apparatus provided by the embodiment of the present disclosure, as shown in FIG. 3, the array substrate 201 includes: a first base substrate 2011; an antireflection layer 2012 located on the first base substrate 2011; and a metal layer 2013 located on one side, facing away from the first base substrate 2011, of the antireflection layer 2012; where an orthographic projection of the antireflection layer 2012 on the first base substrate 2011 completely coincides with an orthographic projection of the metal layer 2013 on the first base substrate 2011.

In the present disclosure, because the array substrate 201 is inverted to be at the top, all metal layers 2013 on the array substrate 201 will reflect ambient light, and a display face of the display apparatus is a side where the array substrate 201 is located, so that the light reflected by the metal layer 2013 will affect a display effect. By arranging the antireflection layer 2012 between the metal layer 2013 and the first base substrate 2011 for shielding the metal layer 2013, a reflectance of the ambient light on the metal layer 2013 is effectively lowered and the display effect is improved. In particular, a test result shows that, a reflectance in the case of no antireflection layer 2012 is 9.2, and a reflectance in the case of adding the antireflection layer 2012 is 6.78, which is lowered by 26%. Exemplarily, the antireflection layer 2012 may be made from a molybdenum (Mo) metal oxide.

Optionally, in the display apparatus provided by the embodiment of the present disclosure, the metal layer 2013 may be a gate metal layer and/or a source and drain metal layer. In particular, when the metal layer 2013 is the gate metal layer, a gate mask for manufacturing a gate metal layer in the related art may be adopted for the antireflection layer 2012 to form the antireflection layer 2012 and the gate metal layer through a single patterning process. When the metal layer 2013 is the source and drain metal layer, an SD mask for manufacturing a source and drain metal layer in the related art may be adopted for the antireflection layer 2012 to form the antireflection layer 2012 and the source and drain metal layer through a single patterning process. When the metal layers 2013 are the gate metal layer and the source and drain metal layer, the antireflection layer 2012 may include a first antireflection layer and a second antireflection layer. The gate mask for manufacturing the gate metal layer in the related art may be specifically adopted to form the first antireflection layer and the gate metal layer through a single patterning process; and the SD mask for manufacturing the source and drain metal layer in the related art may be adopted to form the second antireflection layer and the source and drain metal layer through a single patterning process; Or, the antireflection layer 2012 is a single film layer, the antireflection layer 2012 needs to be manufactured first through a single patterning process, and then the gate metal layer and the source and drain metal layer are respectively manufactured through additional masking processes twice, so that the antireflection layer 2012 completely coincides with the gate metal layer and the source and drain metal layer.

Figure 4:
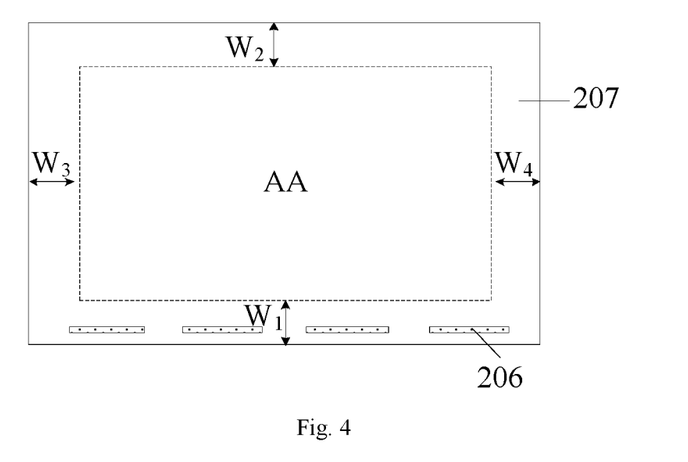
FIG. 4 is a schematic diagram of a front-view structure of a display apparatus provided by an embodiment of the present disclosure.

Optionally, in the display apparatus provided by the embodiment of the present disclosure, as shown in FIG. 3 and FIG. 4, the display module 02 may further include: a light shielding layer 207 located between the first polarizer 203 and the array substrate 201, where the light shielding layer 207 is located in a frame region (specifically including a lower frame $W_1$, an upper frame $W_2$, a left frame $W_3$, and a right frame $W_4$) of the display module 02, and the frame region surrounds a display region (AA).

Driver ICs such as a gate driving circuit (GOA) and a source driving circuit 206 are generally arranged in the frame region of the display module 02. Because metal wires of the driver ICs are dense, a vision difference between the frame region and the display region is relatively obvious. By arranging the light shielding layer 207 in the frame region, the metal wires in the frame region are effectively shielded, and a color different caused by different density of the metal wires between the frame region and the display region is reduced. In addition, the light shielding layer 207 may shield backlight rays of the frame region and prevent light leakage. Optionally, a material of the light shielding layer 207 may be black printing ink.

Figure 5:
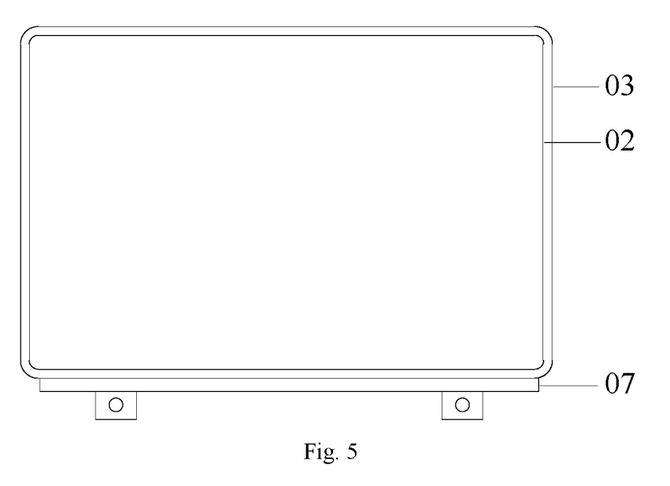
FIG. 5 is a schematic diagram of another front-view structure of a display apparatus provided by an embodiment of the present disclosure.
Figure 6:
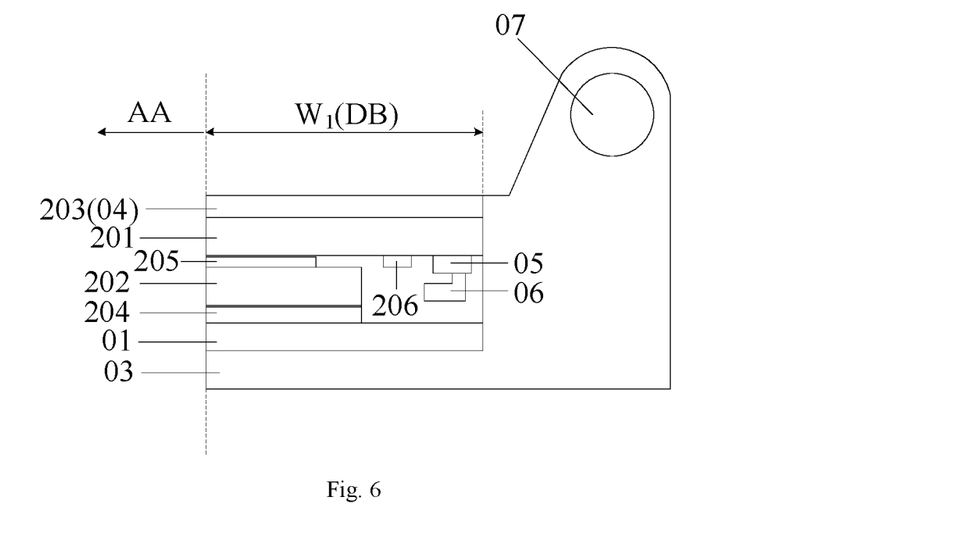
FIG. 6 is a schematic structural diagram of a lower frame contained in a display apparatus provided by an embodiment of the present disclosure.

Optionally, in the display apparatus provided by the embodiment of the present disclosure, as shown in FIG. 3, FIG. 5 and FIG. 6, the array substrate 201 includes a first part $P_1$ and a second part $P_2$, where an orthographic projection of the first part $P_1$ on the back part completely coincides with an orthographic projection of the color film substrate 202 on the back part, an orthographic projection of the second part $P_2$ on the back part does not overlap with the orthographic projection of the color film substrate 202 on the back part and is located within the frame region of the display module 02, and an orthographic projection of the backlight module 01 on the back part completely coincides with an orthographic projection of the array substrate 201 on the back part. The second part $P_2$, the backlight module 01, the color film substrate 202 and the side parts constitute an accommodating space.

The display apparatus further includes: a flexible circuit board 05 located on one side, facing the color film substrate 202, of the second part; a driving circuit board 06 electrically connected with the flexible circuit board 05; and a hollow rotating shaft 07 hinged with one of the side parts. The driving circuit board 06 is bent and arranged in the accommodating space; or one end, facing away from the flexible circuit board 05, of the driving circuit board 06 passes through the hinged side part to be fixed in the hollow rotating shaft 07. In particular, a via hole may be punched in the side part, and then the driving circuit board 06 itself is guided out through the via hole to be fixed in the rotating shaft 07; or hinge spaces on two sides of the hollow rotating shaft 07 may be utilized to accommodate the end, facing away from the flexible circuit board 05 of the driving circuit board 06.

Figure 7:
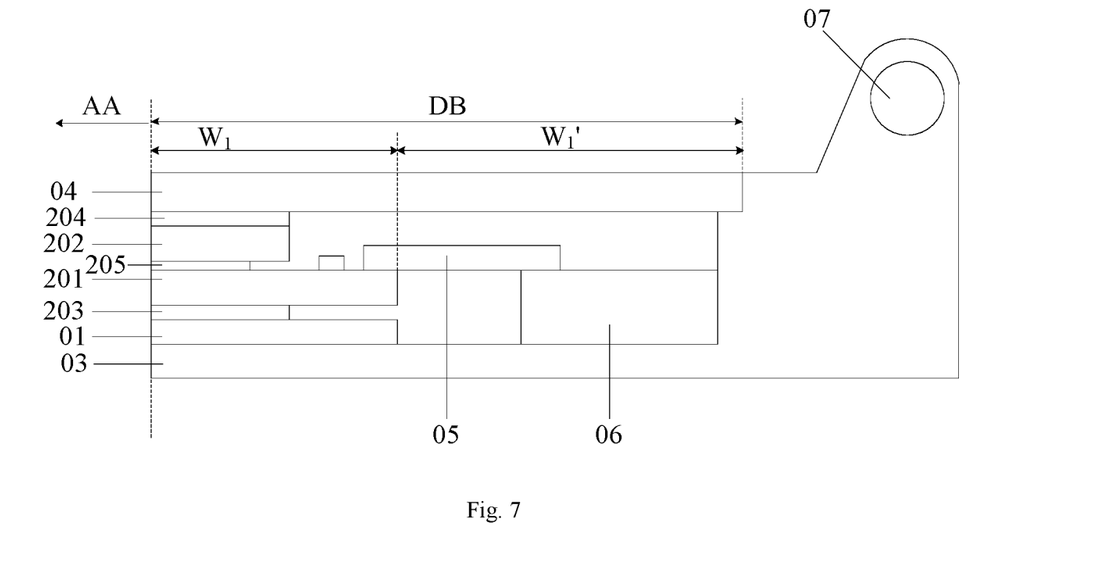
FIG. 7 is a schematic structural diagram of a lower frame contained in the display apparatus as shown in FIG. 2.

In the display apparatus provided by the embodiment of the present disclosure, by hiding the driving circuit board 06 in the hollow rotating shaft 07 of the display apparatus, or bending the driving circuit board 06 in the accommodating space, the display module 02 is directly in lap joint with the shell 03, so that a distance $W_1'$ of a lap joint between the protective cover plate 04 and the shell 03 is omitted. A lower frame DB of an entire apparatus is completely constituted by the lower frame $W_1$ of the display module 02, as shown in FIG. 6 and FIG. 7. The other three frames are mainly decided by frames of the display module 02. Compared with a structure shown in FIG. 2, the frames at four edges are further lowered, a screen-to-body ratio of the display apparatus may be further improved, and a full screen structure is advantageously achieved.

In general, in the display apparatus provided by the embodiment of the present disclosure, as shown in FIG. 3, the display apparatus may further include a liquid crystal layer 208 located between the array substrate 201 and the color film substrate 202, and orientation layers (not shown in the figure) that are respectively located on two sides of the liquid crystal layer 208. The array substrate 201 may further include: a first insulating layer 2014, a flat layer 2015, a common electrode 2016, a second insulating layer 2017 and a pixel electrode 2018. The color film substrate 202 may include: a second base substrate 2021, a color resistance layer 2022 and a black matrix 2023. The common electrode 2016 may be arranged on the color film substrate 202, and specifically may be located on one side, facing the liquid crystal layer 208, of the color resistance layer 2022. The color resistance layer 2022 may include, but is not limited to a red light color resistor R, a green light color resistor G and a blue light color resistor B.

Correspondingly, an embodiment of the present disclosure further provides a manufacturing method of the above-mentioned display apparatus, specifically including the following steps.

Step 1: a plurality of display panels are manufactured on a mother board, where each display panel includes an array substrate 201 and a color film substrate 202 which are opposite to each other, a liquid crystal layer 208 located between the array substrate 201 and the color film substrate 202, and a sealant 205 sealing the array substrate 201 and the color film substrate 202.

During specific implementation, a manufacturing process of the array substrate 201 is as follows.

A first base substrate 2011 is provided.

An antireflection layer 2012 and a metal layer 2013 are manufactured on the first base substrate 2011; where an orthographic projection of the antireflection layer 2012 on the first base substrate 2011 completely coincides with an orthographic projection of the metal layer 2013 on the first base substrate 2011. Optionally, the above-mentioned step of manufacturing the antireflection layer 2012 and the metal layer 2013 on the first base substrate 2011 may be realized specifically through the following two modes.

The first implementation mode is that: an antireflection film and a metal film are formed on the first base substrate 2011 in sequence; and a single masking process is performed on the metal film and the antireflection film to form the antireflection layer and the metal layer provided with consistent patterns. In particular, the metal layer is a gate metal layer or a source and drain metal layer.

The second implementation mode is that: an antireflection film is formed on the first base substrate 2011 and a single masking process is performed on the antireflection film to form the antireflection layer 2012 with a pattern consistent with that of a subsequent gate metal layer and a source and drain metal layer; and the masking process are performed twice on the antireflection layer 2012 in sequence to respectively form the gate metal layer and the source and drain metal layer.

Manufacturing methods of an active layer, a first insulating layer 2014, a flat layer 2015, a common electrode 2016, a second insulating layer 2017 and a pixel electrode 2018 contained by the array substrate 201, and manufacturing methods of a color resistance layer 2022 and a black matrix 2023 contained by the color film substrate 202 are the same as in the related art and repetition will not be made here.

Step 2: an independent display panel is formed by cutting in a cutter wheel cutting mode.

Step 3: in order to match with an overall appearance of a notebook computer, shaped cutting needs to be performed on a single display panel, and rounded cutting of the display panel may be realized in a mode of grinding and laser cutting.

Step 4: in order to prevent a surrounding region of the display panel from light leakage, and prevent a problem of reflection caused by metal routing wires on the inverted array substrate 201, ink printing needs to be performed on a frame region of the display panel to manufacture a light shielding layer 207, and the procedure may be realized in a mode of screen transfer printing.

Step 5: a first polarizer 203 and a second polarizer 204 are attached on the printed display panel, where a size of the second polarizer 204 on the color film substrate 202 is smaller than a size of the display panel, and a size of the first polarizer 203 on the array substrate 201 is larger than a size of the array substrate 201. A part, exceeding the array substrate 201, of the first polarizer 203 is cut in a way that a carbon dioxide laser scans surrounding tracks of the array substrate 201 to ensure that the first polarizer 203 is completely flush with the array substrate 201, and therefore manufacturing of the display module 02 is completed.

Step 6: a driving circuit board 06 and a flexible circuit board 05 are attached on the display module 02, one end of the flexible circuit board 05 is attached to the array substrate 201, and the other end is attached to the driving circuit board 06.

Step 7: a backlight module 01, the display module 02 and a shell 03 are assembled; parts, being in contact with the shell 03, of the backlight module 01 and the display module 02 may be bonded through tape to achieve an effect of fixation; and the driving circuit board 06 may be fixed in a hollow rotating shaft 07 through tape or screws, or be bent and fixed in an accommodating space formed by the array substrate 201, the backlight module 01, the color film substrate 202 and side parts, so that assembling of an entire display apparatus is completed.

It should be noted that, in the manufacturing method provided by the embodiments of the present disclosure, patterning processes involved in forming various layers of structures may include a part or all process procedures such as deposition, photoresist coating, masking, exposure, development, etching, and photoresist stripping, and may also include other process procedures, according to figures which needed to be patterned in an actual manufacturing procedure, which are not limited here. For example, a postbaking process may be included after development and before etching.

A deposition process may be a chemical vapor deposition method, a plasma enhanced chemical vapor deposition method, or a physical vapor deposition method, which is not limited here. A mask used in the masking process may be a half tone mask, a single slit mask or a gray tone mask, which is not limited here. Etching may be dry etching or wet etching, which is not limited here.

According to the display apparatus and the manufacturing method of the array substrate comprised therein provided by the embodiments of the present disclosure, the display apparatus includes: the backlight module, the display module located on the light-emitting side of the backlight module, and the shell accommodating the backlight module and the display module. The display module includes: the array substrate and the color film substrate which are opposite to each other, and the first polarizer located on one side, facing away from the color film substrate, of the array substrate; where the color film substrate is located between the array substrate and the backlight module, the orthographic projection of the first polarizer on the array substrate completely coincides with the array substrate, and the first polarizer is multiplexed as the protective cover plate. The shell includes: the back part located on one side, facing away from the color film substrate, of the backlight module; and the plurality of side parts which are in touch with the back part and perpendicular to the back part; where all the side parts are in contact with the side face of the array substrate and the side face of the first polarizer; and one side, facing away from the back part, of the side parts is flush with one side, facing away from the array substrate, of the first polarizer. The array substrate is inverted to be at the top, and the first polarizer on the array substrate is multiplexed as the protective cover plate, which avoids the arrangement of the separate protective cover plate and saves the bonding process of the protective cover plate, thereby realizing the lightness and the thinness of the display apparatus, simplifying the manufacturing process, and improving the product yield.

Apparently, those of skill in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A display apparatus, comprising:
    a backlight module;
    a display module arranged on a light-emitting side of the backlight module; and
    a shell accommodating the backlight module and the display module;
    wherein the display module comprises:
    an array substrate and a color film substrate which are opposite to each other; and
    a first polarizer arranged on one side, facing away from the color film substrate, of the array substrate;
    wherein the color film substrate is arranged between the array substrate and the backlight module, an orthographic projection of the first polarizer on the array substrate completely coincides with the array substrate, and the first polarizer is multiplexed as a protective cover plate;
    wherein the shell comprises:
    a back part arranged on one side, facing away from the color film substrate, of the backlight module; and
    a plurality of side parts which are in touch with the back part and perpendicular to the back part;
    wherein the plurality of side parts are in contact with a side face of the array substrate and a side face of the first polarizer; and
    one side, facing away from the back part, of the plurality of side parts is flush with one side, facing away from the array substrate, of the first polarizer;
    wherein the array substrate comprises a first part and a second part;
    an orthographic projection of the first part on the back part completely coincides with an orthographic projection of the color film substrate on the back part;
    an orthographic projection of the second part on the back part does not overlap with the orthographic projection of the color film substrate, and is arranged within a frame region of the display module;
    an orthographic projection of the backlight module on the back part completely coincides with an orthographic projection of the array substrate on the back part; and
    the second part, the backlight module, the color film substrate and the plurality of side parts constitute an accommodating space.

2. The display apparatus according to claim 1, wherein the array substrate comprises:
    a base substrate;
    an antireflection layer arranged on the base substrate; and
    a metal layer arranged on one side, facing away from the base substrate, of the antireflection layer;
    wherein an orthographic projection of the antireflection layer on the base substrate completely coincides with an orthographic projection of the metal layer on the base substrate.

3. The display apparatus according to claim 2, wherein the metal layer is a gate metal layer and/or a source and drain metal layer.

4. The display apparatus according to claim 1, wherein the display module further comprises: a light shielding layer arranged between the first polarizer and the array substrate;
    the light shielding layer is arranged in a frame region of the display module; and
    the frame region surrounds a display region of the display module.

5. The display apparatus according to claim 1, wherein the display apparatus further comprises:
    a flexible circuit board arranged on one side, facing the color film substrate, of the second part;
    a driving circuit board electrically connected with the flexible circuit board; and
    a hollow rotating shaft hinged with one of the plurality of side parts;
    wherein the driving circuit board is bent and arranged in the accommodating space; or,
    one end, facing away from the flexible circuit board, of the driving circuit board passes through the hinged side part to be fixed in the hollow rotating shaft.

6. The display apparatus according to claim 1, further comprising a second polarizer arranged between the color film substrate and the backlight module;
    wherein an orthographic projection of the second polarizer on the color film substrate completely coincides with the color film substrate; and
    a light transmitting axis of the second polarizer and a light transmitting axis of the first polarizer are perpendicular to each other.

7. The display apparatus according to claim 1, wherein the display module further comprises: a liquid crystal layer arranged between the array substrate and the color film substrate.

8. A manufacturing method of an array substrate comprised in the display apparatus according to claim 1, comprising:

providing a base substrate; and manufacturing an antireflection layer and a metal layer on the base substrate;

wherein an orthographic projection of the antireflection layer on the base substrate completely coincides with an orthographic projection of the metal layer on the base substrate.

9. The manufacturing method according to claim 8, wherein the manufacturing the antireflection layer and the metal layer on the base substrate comprises:

forming an antireflection film and a metal film on the base substrate in sequence; and forming the antireflection layer and the metal layer provided with consistent patterns by performing a single masking process on the metal film and the antireflection film.

10. The manufacturing method according to claim 8, wherein the manufacturing the antireflection layer and the metal layer on the base substrate comprises:

forming an antireflection film on the base substrate, and forming the antireflection layer provided with a pattern consistent with that of a subsequent gate metal layer and a source and drain metal layer by performing a single masking process on the antireflection film; and forming the gate metal layer and the source and drain metal layer respectively by performing a masking process twice on the antireflection layer in sequence.

* * * * *